United States Patent
Karl

(10) Patent No.: US 10,385,222 B2
(45) Date of Patent: Aug. 20, 2019

(54) COATING MATERIALS AND THE USE THEREOF IN COATING SYSTEMS FOR COMPONENTS IN VEHICLE INTERIORS

(71) Applicant: MANKIEWICZ GEBR. & CO. GMBH & CO. KG, Hamburg (DE)

(72) Inventor: Hans-Juergen Karl, Hamburg (DE)

(73) Assignee: MANKIEWICZ GEBR. & CO. GMBH & CO. KG, Hamburg (DE)

( * ) Notice: Subject to any disclaimer, the term of this patent is extended or adjusted under 35 U.S.C. 154(b) by 189 days.

(21) Appl. No.: 14/915,644

(22) PCT Filed: Sep. 3, 2014

(86) PCT No.: PCT/DE2014/000450
§ 371 (c)(1),
(2) Date: Mar. 1, 2016

(87) PCT Pub. No.: WO2015/032379
PCT Pub. Date: Mar. 12, 2015

(65) Prior Publication Data
US 2016/0194503 A1 Jul. 7, 2016

(30) Foreign Application Priority Data
Sep. 5, 2013 (DE) .......... 10 2013 014 683

(51) Int. Cl.
| | |
|---|---|
| C09D 5/18 | (2006.01) |
| C08G 12/42 | (2006.01) |
| C09D 161/32 | (2006.01) |
| C09D 167/00 | (2006.01) |
| C09D 167/04 | (2006.01) |
| C09D 169/00 | (2006.01) |
| C09D 171/00 | (2006.01) |
| C09D 175/04 | (2006.01) |
| B05D 3/06 | (2006.01) |
| C09D 133/14 | (2006.01) |

(52) U.S. Cl.
CPC .............. *C09D 5/18* (2013.01); *B05D 3/06* (2013.01); *C08G 12/427* (2013.01); *C09D 161/32* (2013.01); *C09D 167/00* (2013.01); *C09D 167/04* (2013.01); *C09D 169/00* (2013.01); *C09D 171/00* (2013.01); *C09D 175/04* (2013.01); *C09D 133/14* (2013.01)

(58) Field of Classification Search
CPC ....... C09D 5/18; C09D 161/32; C08G 12/427
See application file for complete search history.

(56) References Cited

U.S. PATENT DOCUMENTS

| | | | |
|---|---|---|---|
| 5,223,323 A | 6/1993 | Dickerhof et al. | |
| 6,566,433 B1 * | 5/2003 | Ochsner | C09D 161/28 524/387 |
| 2002/0000536 A1 * | 1/2002 | Spitz | C07D 251/64 252/182.13 |
| 2003/0138650 A1 | 7/2003 | Fay et al. | |
| 2006/0223953 A1 | 10/2006 | Drescher et al. | |
| 2008/0090956 A1 | 4/2008 | Munzmay et al. | |
| 2008/0305702 A1 * | 12/2008 | Nun | A01N 59/16 442/71 |
| 2011/0097544 A1 | 4/2011 | Grün et al. | |
| 2011/0178238 A1 | 7/2011 | Koschabek et al. | |
| 2012/0135245 A1 * | 5/2012 | Richert | B05D 7/57 428/423.1 |
| 2014/0378587 A1 | 12/2014 | Weiher et al. | |

FOREIGN PATENT DOCUMENTS

| | | |
|---|---|---|
| CN | 1639238 A | 7/2005 |
| CN | 1687271 A | 10/2005 |
| CN | 1847344 A | 10/2006 |
| CN | 101210123 A | 7/2008 |
| CN | 101445690 A | 6/2009 |
| DE | 39 05 268 A1 | 8/1990 |
| DE | 10 2008 016 050 A1 | 6/2009 |
| DE | 10 2009 050 601 A1 | 4/2011 |
| JP | 11-1632 A | 1/1999 |
| WO | WO 2012/036183 A1 | 3/2012 |
| WO | WO 2013/113893 A1 | 8/2013 |

\* cited by examiner

*Primary Examiner* — Nicholas E Hill
(74) *Attorney, Agent, or Firm* — Norman B. Thot

(57) ABSTRACT

A coating material includes 10 to 30 wt.-% of a polyol, 2 to 15 wt.-% of an etherified melamine-formaldehyde resin, 0.1 to 10 wt.-% of an acid catalyst, and at least one of a flame retardant, a filler, and a pigment in an amount to obtain a filler content in a range of from 60 to 80 wt.-% based on an overall mass of the coating material. The flame retardant is selected from the group consisting of an inorganic flame retardant, a halogenated flame retardant, a nitrified flame retardant, a boracic flame retardant, an intumescent flame retardant, and mixtures thereof.

19 Claims, No Drawings

COATING MATERIALS AND THE USE THEREOF IN COATING SYSTEMS FOR COMPONENTS IN VEHICLE INTERIORS

CROSS REFERENCE TO PRIOR APPLICATIONS

This application is a U.S. National Phase application under 35 U.S.C. § 371 of International Application No. PCT/DE2014/000450, filed on Sep. 3, 2014 and which claims benefit to German Patent Application No. 10 2013 014 683.6, filed on Sep. 5, 2013. The International Application was published in German on Mar. 12, 2015 as WO 2015/032379 A1 under PCT Article 21(2).

FIELD

The present invention relates to coating materials to coat component surfaces, in particular, to coat interior components in passenger vehicles. The present invention also applies to the use of the coating materials in coating systems and to methods for the production of coated components.

BACKGROUND

Components used for finishing or cladding vehicle interiors are referred to below as interior components. Installed interior components must generally comply with fire protection regulations for passenger vehicles. Requirements relating to flammability, smoke emission, and toxicity of the materials set free in the event of fire are usually referred to as FST (flammability, smoke, toxicity) properties. Flame retardancy is here the capability of materials, products or components to withstand the effects of flames or sources of ignition or, equivalently, the capacity to prevent the spread of fire energetically, kinetically, chemically or mechanically. The test procedure to determine flame retardancy simulates an actual fire situation under reproducible conditions. Different physico-chemical data, such as the kindling temperature and the ignition point or the composition of the pyrolysate vapors, are acquired during the test procedure.

Plastic, fiber composite, or metal is usually used to finish or clad vehicle interiors. Visible surfaces of the components installed are generally provided with an individual décor to decorate and to visually design the vehicle interior. This can be in the form of either colored patterns or three-dimensional structures on the surface.

The color design of component surfaces for interior cladding, in particular for aircraft cabins, in the form of foil-cladding or laminated films, structured as required, has previously been described. In commonly used process, interior components are decorated by applying FST-conformal, two-component coating materials. The coating systems usually employed consist of two filler layers and two top coat layers, while the second top coat layer serves as the substrate for a surface structure. This finish therefore has a high area density. This is particularly disadvantageous for vehicles in which weight plays a role, such as aircraft. A further disadvantage of known coating systems is the long process times for their application, which are caused by the evaporation and curing times necessary for each individual layer. Filler layers must furthermore be smoothed prior to the application of the following coating in order to obtain a smooth surface. The methods commonly used to date are therefore very labor-intensive and consequently expensive.

The use of a powder coating to coat component surfaces is described by DE 10 2009 050 601 A1. The powder coatings are applied to the component surfaces by the electrostatic powder coating method and cured at a temperature of 130° C. The commonly employed powder coatings must be cured at a comparatively high temperature, in the range of 130 to 160° C., so that this method only has limited suitability to coat plastic components.

SUMMARY

An aspect of the present invention is to provide improved coatings for the coating of interior components which conform to the required FST properties, which exhibit a reduced weight, and which can be applied in a simple manner.

In an embodiment, the present invention provides a coating material which includes 10 to 30 wt.-% of a polyol, 2 to 15 wt.-% of an etherified melamine-formaldehyde resin, 0.1 to 10 wt.-% of an acid catalyst, and at least one of a flame retardant, a filler, and a pigment in an amount to obtain a filler content in a range of from 60 to 80 wt.-% based on an overall mass of the coating material. The flame retardant is selected from the group consisting of an inorganic flame retardant, a halogenated flame retardant, a nitrified flame retardant, a boracic flame retardant, an intumescent flame retardant, and mixtures thereof.

DETAILED DESCRIPTION

The coating materials according to the present invention are used to produce single-component fire-resistant lacquers. The term "fire prevention" will be used below in connection with coatings and coating systems which exhibit the FST properties and FST values (flammability, smoke gas density, heat release, and toxicity of the smoke gases) specified in the aviation industry.

Coating materials on the basis of two-component polyurethane systems are usually employed to comply with the FST values for interiors. Contrary thereto, the coating materials according to the present invention only have a single component containing a combination of polyols, etherified melamine-formaldehyde resins and acid catalysts as a binding agent. This combination is comprised of 10 to 30 wt.-% polyols, 2 to 15 wt.-% etherified melamine-formaldehyde resins, 0.1 to 10 wt.-% acid catalysts, and fillers, in which sufficient amounts of flame retardants and/or pigments are present to obtain a filler content in the range 60 to 80 wt.-%, for example, of 65 to 75 wt.-%. An example of the combination is 12 to 25 wt.-% polyols, 3 to 10 wt.-% etherified melamine-formaldehyde resins, and 0.3 to 5 wt.-% acid catalysts.

Suitable polyols are polyacrylate-polyols, polyester-polyols, polyether-polyols, polycarbonate polyols, polycaprolactone-polyols and polyurethane-polyols. Polyacrylate-polyols and polyurethane-polyols can, for example, be used. Polyester-polyols on the basis of phthalic acid can, for example, be used.

Suitable melamine resins are etherified melamine-formaldehyde resins, in particular methanol-etherified, ethanol-etherified, propanol-etherified, isobutanol-etherified and n-butanol-etherified melamine-formaldehyde resins. Methanol-etherified, isobutanol-etherified and n-butanol-etherified melamine-formaldehyde resins can, for example, be used. Methanol-etherified melamine-formaldehyde resins can, for example, be used.

Suitable acid catalysts are strong organic Brønsted acids. Organic sulfonic acids can, for example, be used. Dinonyl naphthalin disulphonic acid or p-toluenesulphonic acid can, for example, be used.

In an embodiment of the present invention, the combinations can, for example, comprise polyacrylate-polyols, methanol-etherified melamine-formaldehyde resins, and dinonyl naphthalin disulfonic acid or p-toluenesulfonic acid. In an embodiment, the combinations can, for example, comprise polyacrylate-polyols, ethanol-etherified melamine-formaldehyde resins and dinonyl naphthalin disulfonic acid or p-toluenesulfonic acid. In an embodiment, the combinations can, for example, comprise polyacrylate-polyols, propanol-etherified melamine-formaldehyde resins and dinonyl naphthalin disulfonic acid or p-toluenesulfonic acid. In an embodiment, the combinations can, for example, comprise polyacrylate-polyols, butanol-etherified melamine-formaldehyde resins and dinonyl naphthalin disulfonic acid or p-toluenesulfonic acid.

In an embodiment of the present invention, the combinations can, for example, comprise polyester-polyols, methanol-etherified melamine-formaldehyde resins and dinonyl naphthalin disulfonic acid or p-toluenesulfonic acid. In an embodiment, the combinations can, for example, comprise polyester-polyols, ethanol-etherified melamine-formaldehyde resins and dinonyl naphthalin disulfonic acid or p-toluenesulphonic acid. In an embodiment, the combinations can, for example, comprise polyester-polyols, propanol-etherified melamine-formaldehyde resins and dinonyl naphthalin disulfonic acid or p-toluenesulfonic acid. In an embodiment, the combinations can, for example, comprise polyester-polyols, butanol-etherified melamine-formaldehyde resins and dinonyl naphthalin disulfonic acid or p-toluenesulfonic acid.

In an embodiment of the present invention, the combinations can, for example, comprise polyether-polyols, methanol-etherified melamine-formaldehyde resins and dinonyl naphthalin disulfonic acid or p-toluenesulfonic acid. In an embodiment, the combinations can, for example, comprise polyether-polyols, ethanol-etherified melamine-formaldehyde resins and dinonyl naphthalin disulfonic acid or p-toluenesulfonic acid. In an embodiment, the combinations can, for example, comprise polyether-polyols, propanol-etherified melamine-formaldehyde resins and dinonyl naphthalin disulfonic acid or p-toluenesulfonic acid. In an embodiment, the combinations can, for example, comprise polyether-polyols, butanol-etherified melamine-formaldehyde resins and dinonyl naphthalin disulfonic acid or p-toluenesulfonic acid.

In an embodiment of the present invention, the combinations can, for example, comprise polycarbonate-polyols, methanol-etherified melamine-formaldehyde resins and dinonyl naphthalin disulfonic acid or p-toluenesulfonic acid. In an embodiment, the combinations can, for example, comprise polycarbonate-polyols, ethanol-etherified melamine-formaldehyde resins and dinonyl naphthalin disulfonic acid or p-toluenesulfonic acid. In an embodiment, the combinations can, for example, comprise polycarbonate-polyols, propanol-etherified melamine-formaldehyde resins and dinonyl naphthalin disulfonic acid or p-toluenesulfonic acid. In an embodiment, the combinations can, for example, comprise polycarbonate-polyols, butanol-etherified melamine-formaldehyde resins and dinonyl naphthalin disulfonic acid or p-toluenesulfonic acid.

In an embodiment of the present invention, the combinations can, for example, comprise polycaprolactones, methanol-etherified melamine-formaldehyde resins and dinonyl naphthalin disulfonic acid or p-toluenesulfonic acid. In an embodiment, the combinations can, for example, comprise polycaprolactones, ethanol-etherified melamine-formaldehyde resins and dinonyl naphthalin disulfonic acid or p-toluenesulfonic acid. In an embodiment, the combinations can, for example, comprise polycaprolactones, propanol-etherified melamine-formaldehyde resins and dinonyl naphthalin disulfonic acid or p-toluenesulfonic acid. In an embodiment, the combinations can, for example, comprise polycaprolactones, butanol-etherified melamine-formaldehyde resins and dinonyl naphthalin disulfonic acid or p-toluenesulfonic acid.

In an embodiment of the present invention, the combinations can, for example, comprise polyurethane-polyols, methanol-etherified melamine-formaldehyde resins and dinonyl naphthalin disulfonic acid or p-toluenesulfonic acid. In an embodiment, the combinations can, for example, comprise polyurethane-polyols, ethanol-etherified melamine-formaldehyde resins and dinonyl naphthalin disulfonic acid or p-toluenesulfonic acid. In an embodiment, the combinations can, for example, comprise polyurethane-polyols, propanol-etherified melamine-formaldehyde resins and dinonyl naphthalin disulfonic acid or p-toluenesulfonic acid. In an embodiment, the combinations can, for example, comprise polyurethane-polyols, butanol-etherified melamine-formaldehyde resins and dinonyl naphthalin disulfonic acid or p-toluenesulfonic acid.

The coating material according to the present invention can incorporate surprisingly high fractions of solids without compromising the properties of the cured coating. This means that, in addition to the usual pigments and fillers, flame retardants can be added in sufficient amounts without impairing the chemical and mechanical properties of the cured coating.

In accordance with the present invention, all organic pigments and organic pigments known to and commonly used by a skilled person, such as arylamide yellow, diarylide yellow, nickel azo yellow, anthrapyrimidine yellow, pyranthrone yellow, isoindolinone yellow, arylamide orange, diarylide orange, azo-condensation orange, anthanthrone orange, pyrenthrone orange, trans perinone orange, chinacridone orange, isoindolinone orange, toluidine red, lithol red, naphthol AS red, azo-condensation red, perylene red, thioindigo red, chinacridone red, isoindolinone red, isoviolanthrone violet, indanthrene violet, chinacridone violet, dioxazine violet, phthalocyanine blue, indanthrene blue, phthalocyanine greenbone black, or aniline black, can be used. Furthermore, in accordance with the present invention, all inorganic pigments and inorganic pigments known to and commonly used by a skilled person, such as titanium dioxide, zinc sulfide, lithopone, basic lead carbonate, basic lead sulfate, basic lead silicate, zinc oxide, antimony oxide, iron oxide yellow, chrome yellow, cadmium yellow, nickel titanium yellow, chrome orange, molybdate orange, cadmium orange, iron oxide red, cadmium red, copper oxide, molybdate red, ultramarine red, mixed phase red, mineral violet, manganese violet, ultramarine violet, iron blue, ultramarine blue, cobalt blue, chrome oxide green, chrome oxide hydrate green, ultramarine green, mixed phase green pigments, iron oxide brown, mixed phase brown, iron oxide black, antimony sulfide, graphite, gas black, thermal carbon black, furnace soot, lamp black, or acetylene black, can be used. Examples include inorganic pigments, in particular titanium dioxide, zinc sulfide, lithopone, zinc oxide, antimony oxide, iron oxide yellow, nickel titanium yellow, molybdate orange, iron oxide red, copper oxide, molybdate red, ultramarine red, mixed phase red, mineral violet, manganese violet, ultramarine violet, iron blue, ultramarine blue, cobalt blue, chrome oxide green, chrome oxide hydrate green, ultramarine green, mixed phase green pigments, iron oxide brown, mixed phase brown, iron oxide black, antimony sulfide, graphite, gas black, thermal carbon black, furnace soot, lamp black or acetylene black.

Suitable fillers are, for example, carbonates such as chalk, limestone meal, calcite, precipitated calcium carbonate, dolomite or barium carbonate, sulfates such as barite, blanc fixe or calcium sulfate, silicates such as talcum, pyrophyllite, chlorite, hornblende, mica, china clay, wollastonite, slate powder, precipitated calcium silicates, precipitated aluminum silicates, precipitated calcium-aluminum silicates, precipitated sodium-aluminum silicates, feldspars or mullite, silicic acids such as quartz, fused silica, cristobalite, diatomaceous earth, silica, precipitated silicic acid, pyrogenic silicic acid, pumice powder, perlite or calcium metasilicate, as well as fibers from glass or basalt melts, glass flour, glass beads, or slags.

Suitable flame retardants are, for example, inorganic flame retardants, halogenated, nitrified, and boracic flame retardants, intumescent flame retardants, or mixtures thereof. Suitable inorganic flame retardants are, for example, non-flammable fillers, such as oxides, hydroxides, oxide hydrates, mixed oxides, sulfides, sulfates, carbonates, phosphates, fluorides of Mg, Ca, Sr, Ba, Ti, V, Cr, Mn, Fe, Co, Ni, Cu, Zn, Zr, Nb, Mo, Cd, W, Hg, Al, Ga, In, Si, Ge, Sn, Pb, Sb, or Bi, aluminum oxides/hydroxides, magnesium oxide, aluminum trihydroxide, magnesium dihydroxide, metal phosphates, ammonium polyphosphates, borates, zinc borates, sodium tetraborate decahydrate, antimony trioxide, antimony pentoxide, and red phosphorus. Suitable halogenated flame retardants are, for example, decabromodiphenyl oxide, ethane-1,2-bis(pentabromophenol), ethylene bis(tetrabromophthalimide), brominated polystyrene, tribromodiphenyl ether, tetrabromodiphenyl ether, pentabromodiphenyl ether, hexabromodiphenyl ether, heptabromodiphenyl ether, octabromodiphenyl ether, nonabromodiphenyl ether, decabromodiphenyl ether, tetrabromobisphenol A and its derivatives, polybrominated biphenyls such as decabromobiphenyl, hexabromocyclododecane, tetrabromophthalic acid anhydride (TBPA), TBPA diester/ether, ethylene bis(tetrabromophthalimide) (EBTBP), salts of tetrabromophthalates), dibromoethyldibromocyclohexane, ethylene bis(dibromonorbornandicarboximide), dibromoneopentyl glycol (DBNPG), tribromoneopentyl alcohol (TB NPA), vinyl bromide (VBr), 2,4,6-tribromophenol (TBP), bis(tribromophenoxy)ethane (HBPE), tribromophenyl allyl ether (TBP-AE), poly(dibromophenylene oxide) (PDBPO), pentabromoethyl benzene (5BEB), tetradecabromodiphenoxy benzene (TDBDPB), poly(pentabromobenzylacrylate) (PBB-PA) and poly(dibromostyrene) (PDBS). Suitable nitrified flame retardants are, for example, melamine and melamine salts deriving from boric acid, phosphoric acid, and other inorganic acids. Suitable phosphoric flame retardants are, for example, phosphoric acid esters, triphenyl phosphate, tricresyl phosphate, resorcinol bis(diphenylphosphate), (2-((hydroxymethyl)carbamyl)ethyl)phosphonic acid dimethyl ester, tetraphenylresorcinol bis(diphenyl phosphate), and organic phosphinates. Suitable boracic flame retardants are, for example, borax, borates, zinc borate, barium metaborate, calcium metaborate, sodium tetrafluoroborate, and potassium tetrafluoroborate. Suitable intumescent flame retardants are, for example, pure melamine, melamine monophosphate, melamine polyphosphate, melamine cyanurate, melamine pyrophosphate, and expandable graphite. Hydroxides, oxide-hydrates and borates of Al, Mg and Zn, antimony pentoxide, tetradecabromodiphenoxy benzene, brominated polystyrene, polydibromostyrene (PDBS), decabromodiphenyl ether, polybrominated biphenyls, and mixtures of two or three of the above can, for example, be used as flame retardants.

The coating materials of the present invention can also contain the usual auxiliary materials and additives commonly employed by a skilled person, such as wetting agents, rheological additives, or bonding agents. The coating materials can contain up to 21 wt.-% additives and auxiliary materials based on the total weight of the coating material.

The coating materials according to the present invention exhibit high resistance to scratching and good abrasion resistance. Besides these mechanical properties, they also exhibit high resistance to chemicals, water, and solvents. They can therefore be cleaned well, as is particularly desirable for interior surfaces.

The coating materials according to the present invention can also be treated antimicrobially with non-ionic silver particles. The silver particles can, for example, be inorganically modified. Particles with a specific surface of 3 to 5 $m^2/g$, a median value of the particle agglomerates (d50) of the order of 3.5 to 18 µm, and a particle size distribution RSF=(d90−d10)/d50 of the order of 1 to 3.5 can, for example, be used. The modified silver particles can be incorporated in the range 0.1 to 0.5 wt.-% based on the total weight of the coating material.

The coating materials according to the present invention also possess an unexpectedly low viscosity. As a result, only small amounts of solvent are required to adjust the viscosity of the coating material, as required, for example, for application by a spray method or an electrostatic method. Suitable solvents, such as aliphatic carbohydrates, aromatic carbohydrates, hydroaromatic carbohydrates, terpene hydrocarbons, alcohols, esters, ethers, glycol ethers, and ketones, are known to and commonly employed by a skilled person. Xylol, butyl acetate, dimethylbenzene, ethylbenzene, acetic acid butyl ester, dibutyldiglycol acetate, and diacetone alcohol can, for example, be used. The fraction of volatile organic component fraction (VOC) is between 335 and 435 g/l, for example, around 380 g/l. The low fraction of volatile organic solvent is also advantageous for the application and curing process as the evaporation times between the application of the coating material depend primarily on the amount of solvent which evaporates.

The coating materials according to the present invention possess solid contents of 60 to 85 wt.-%, for example, in the range of 70 to 80 wt.-%, for example, approximately 75 wt.-%. They have a pigment volume fraction of 35 to 60%, for example, 50%. The pigment volume fraction is here defined as the quotient of the volume of the pigments and colors to the volume of the entire cured film. The coating materials according to the present invention have a dry layer thickness of 150 µm maximum, while they exhibit a particularly high resistance to mechanical and chemical influences. They also possess FST values corresponding to those of the aircraft industry.

Due to their high fractions of pigments, the coating materials according to the present invention possess a high opacity so that the application of a single layer to the surface of a component already provides a good result. The coating materials according to the present invention can therefore be employed to produce coating systems using only one layer or a maximum of two layers.

In an embodiment, the coating materials according to the present invention can, for example, be employed as a finishing for components, particularly as a finishing for interior components. For this purpose, the layers of the coating materials according to the present invention are produced by curing using IR radiation. The two-layer system for the production of structured surfaces can, for example, be used. The coating materials according to the present invention can be applied directly to the component surface without a pre-treatment of the substrate or component surface being required (direct-to-substrate (DTS) technique). The coating material system according to the present invention can, for example, have a layer thickness of up to 150 μm.

In an embodiment, the coatings according to the present invention can, for example, be used as an in-mold coating for interior components made of glass fiber, reinforced in monolithic or sandwich construction. The coating according to the invention is here applied to the inner surface of a cleaned form provided with a release agent and dried. Prepregs, preferably pre-impregnated with phenol-aldehyde resin, are then laminated onto the form and the resulting construction is cured, for example via an autoclave method. The coating according to the present invention is dried at 80 to 110° C. for 5 to 10 minutes. The construction is cured following the lamination of the prepregs, for example, under 3 bars pressure at temperatures of 128 to 135° C. for 70 minutes.

Compared with the four-layer systems employed to date, the coating systems according to the present invention exhibit a significantly lower weight as a result of a reduction in material. The fewer layers which must be applied and cured with the coatings according to the present invention also significantly shorten processing times.

The coating system according to the present invention can be applied to metallic and non-metallic surfaces of interior components in vehicles. Interior components used for finishing or cladding vehicle interiors are usually made of thermoplastics, such as polyetherimide (PEI), polyphenylsulfone (PPSU), polycarbonate (PC) or polyether ketoneketone (PEKK), of metals, such as aluminum or aluminum alloys, or of glass fiber or carbon fiber, reinforced fiber composite materials in monolithic or sandwich construction. The sandwich components here have, for example, a honeycomb core of phenol resin (impregnated paper and prepreg layers of phenol resin) impregnated glass fiber mats.

The top layer of the coating system according to the present invention can be printed via the usual inkjet method in order to apply colored designs, decors, or pictures to the surface. The usual FST-conformal opaque varnishes can then be applied to protect the printed design.

The coating system according to the present invention can be employed with all components and substrates installed for the decoration of the surface. The fire behavior of the decorated surfaces obtained with the coatings according to the present invention conforms to the required FST properties and corresponds to the fire protection requirements which generally apply for passenger transportation. The surfaces obtained with the coatings according to the present invention also exhibit high resistance to scratching and good abrasion resistance.

The coating system according to the present invention can, for example, be applied following the installation of the visible surfaces of an interior component. Such components are, for example, fold-down hat racks, roof components, storage cabinets (particularly their doors and side panels), partitions, cove light panels, doors and door frames, cladding, handrails, passenger controls (passenger service units (PSU)), and window panels. The coating systems according to the present invention can, for example, be used to decorate interior components of fiber composite materials in monolithic or sandwich construction, as is frequently found in the interior of aircraft or railway carriages.

The coating method employing the present invention fulfills the requirements for the coating of an interior component. In step a) a coating material according to the present invention is applied to the surface of a component, and in step b) is cured to a first layer by IR drying or convection drying. The application of coating materials according to the present invention to the component surface can occur, for example, by a pneumatic compressed air spray method or with an electrostatic finishing application method (ESTA). For example, with the compressed air spray method, a pressure of 3 bars is employed, with nozzles of 1.6 to 1.8 mm. For example, with the electrostatic application method, a current of 50 mA is employed, with a material pressure of 2.3 to 2.5 bars and a nebulizer air pressure of 3 to 4 bars.

The components to be coated must be free of release agents and other impurities. For this purpose, they can be cleaned with cold cleaners, such as isopropanol, before applying the first layer. If required, prior to the application of the first layer, the components can be coated with a conductive primer. Fiber composite and HT thermoplastic material components coated with the ESTA method are in particular pre-treated with a conductive primer. The term conductive primer refers to finishing systems which produce conductive surfaces, as are imperative for electrostatic application methods.

Further treatment for the smoothing of the surfaces to be coated may be necessary, for example, by filling. Shrinkage cavities, that is, hollow spaces which can form during the congealing of the thermoplastics or the curing of a duromer resin matrix, can in particular occur in interior components made of fiber composite materials in monolithic or sandwich construction or thermoplastic components. These must be smoothed or filled prior to coating by the application, curing, and smoothing of a filler layer.

The coatings applied can be cured by convection drying or IR drying. With convection drying, the layers are initially allowed to evaporate for 5 to 30 minutes, for example, 15 to 20 minutes, and, for example, approximately 20 minutes, at room temperature and then cured at 80 to 110° C., for example, at approximately 100° C. for 30 to 90 minutes, for example, 45 to 75 minutes, and, for example, approximately 60 minutes.

In order to obtain a structured surface, a further layer of coating material according to the present invention is applied to the cured first layer in step c), and cured by IR or convection drying in step d). The coating materials according to the present invention can, for example, be applied by the same method as for the first layer. With the electrostatic application method, the first layer is applied at 50 mA with a material pressure 2.3 to 2.5 bars. The pneumatic compressed air spray method utilizes nozzles of 1.6 to 1.8 mm and a nebulizer air pressure of 3 to 4 bars, as for the application of the first layer. The nebulizer air pressure is reduced to 0.4 bars in order to obtain a structured surface.

The cured coating system according to the present invention then has a total dry layer thickness of 80 μm to 110 μm. The coating systems resulting with the usual coating methods exhibit a significantly thicker dry layer of 100 μm to 190 μm. In order to obtain the required FST properties of the coating system, at least two further fire protection fillers layers must be applied and cured in addition to the application and curing of the usual top coat finishes.

In a further processing step, colored designs, decors, or pictures can be printed onto the cured coating system with the usual inkjet method, with the design layer being cured and dried by UV radiation. A final protective layer can be applied to protect the design layer against damaging influences, such as moisture, mechanical loading or impurities. FST-conformal clear coat applied as a dry layer with a thickness 10 to 20 μm are suited for this purpose. The application can, for example, be in the form of the airmix method, a method for application by air-supported hydraulic spraying. The applied layer can be cured and dried by convection heating, IR radiation or UV radiation. This additional clear coat layer improves the scratch resistance, abrasion resistance, and cleanability of the coating system.

EXAMPLES

Example 1

| Wt.-% | Raw Material |
|---|---|
| | Composition of a Top Coat Finish according to the Present Invention |
| 13 | Polyester-polyol |
| 5.5 | Methanol-etherified melamine-formaldehyde resin |
| 2 | Dinonyl naphthalene disulfonic acid |
| 35 | Flame retardant Al(OH)$_3$ |
| 25 | Pigment TiO$_2$ |
| 2 | Bonding agent |
| 1 | Wetting agent |
| 5 | Rheological additive |
| 11.5 | Organic solvent |

As substrate A, sandwich panels with a honeycomb core of phenol resin impregnated paper and a top coat of phenol resin (impregnated glass fiber fabric) were employed. Primed aluminum plates were employed as substrate B. For the preparation of the test specimens, 100 parts by weight of the formulation according to Example 1 were mixed with 10 parts by weight butyl acetate to dilute the spray. The resulting mixture was applied to substrates A and B in the following steps. An initial, smooth layer was applied by cup gun to the surface of the substrate. The applied layer was allowed to evaporate for 15 minutes at room temperature and then dried for 10 minutes at 100° C. The mixture was applied with the cup gun to the cured layer in a second, structure-forming layer. The first and second layers were then cured for 60 minutes at 100° C. to form a coating. The test specimens obtained according to Example 1A and Example 1B were then tested for resistance to chemicals, cleanability, abrasion resistance, and fire behavior.

Example 2

For comparison, a commercially available two-component, polyurethane-based top coat finish and a commercially available filler, such as is commonly employed for the finishing of interior components in the aviation industry, were examined. As substrate A, sandwich panels with a honeycomb core of phenol resin impregnated paper and top coats of phenol resin (impregnated glass fiber fabric) were again employed. Primed aluminum plates were employed as substrate B.

For the preparation of the test specimens, the filler and top coat finish were applied according to the method generally used to date. An initial filler layer was first applied, the applied layer allowed to evaporate for 60 minutes at room temperature, and then cured for a further 60 minutes at 60° C. The cured filler layer was then smoothed. A second filler layer was then applied to the smoothed first filler layer, allowed to evaporate for 60 minutes at room temperature, and then cured for a further 60 minutes at 50° C. The cured layer structure was then ground to a residual dry layer thickness of around 50 μm. An initial, smooth top coat layer was applied to the filler layers and allowed to evaporate for 60 minutes. A second, structure-forming top coat was then applied and allowed to dry for 60 minutes. The entire layer structure was then cured 120 minutes at 60° C. The test specimens obtained according to Example 2A and Example 2B were then tested for resistance to chemicals, cleanability, abrasion resistance and fire behavior.

Testing Methods

Determination of Resistance to Chemicals

Primed aluminum plates with the coating structure to be tested served as test specimens for this test. The resistance to a solution of 5 wt.-% Turco® 5948-DPM cleaning agent (Manufacturer: Henkel KG) in tap water was tested. The test specimens were completely immersed in the cleaning solution at 23° C. for 168 hours. The test specimens were wiped clean and conditioned for 24 hours at 23° C. and 50% relative humidity. The scratch resistance of the coating treated in this manner was then determined using a weighted scribing needle, the tip of which was placed vertically over the surface to be tested and drawn across the surface. The test specimen was then examined visually to determine whether the coating tested exhibited scoring. The maximum loading weight of the scribing needle for which there is no scoring on the coating is a measure of the coating's scratch resistance.

Determination of Cleanability

For the determination of the cleanability of the coatings, the coating surfaces were contaminated with soiling media. As soiling media, pen ink, felt tip pen ink, inkjet printer ink, and lipstick were used. The soiling media were allowed to act on the coating for 24 hours at 23° C. The surface of the coating was then cleaned with a solution of 5 wt.-% Turco® 5948-DPM cleaning agent (Manufacturer: Henkel KG) in tap water, using a soft brush, and then examined visually. The coating was evaluated in respect of the soiling medium as cleanable if, following cleaning, no discoloration or alteration of the surface was determined. As test specimens for this test, sandwich panels with the coating structure to be tested were employed. The evaluation was performed according to the following scheme:

++=No discoloration or alteration
+=Very slight discoloration or alteration
o=Slight discoloration or alteration
−=Discoloration or alteration
−−=Distinct discoloration or alteration.

Determination of Abrasion Resistance

The abrasion resistance of the coatings was tested with the Taber® abraser using type CS 10 Die friction rollers weighed down with a 250 g weight, with 500 revolutions over each test specimen. The abrasion was determined gravimetrically. Primed aluminum plates with the coating structure to be tested were employed as the test specimens for this test.

Fire Behavior Testing

All fire behavior testing was performed in accordance with the regulations of the Federal Aviation Administration of the United States of America (see Code of Federal Regulations 14 CFR, Chapter 1 (1-1-92) of the Federal Aviation Administration, U.S. Department of Transportation).

Flammability

The flammability of the coatings was tested in accordance with Point 25, Appendix F, Part I, Section 5. This consisted of holding a horizontally positioned test specimen 60 seconds in the flame of a gas burner. The longitudinal path over which the coating was burnt off (fire length) was determined. In addition, the time during which the coating continued to burn after removing the gas burner was determined (after-flame time) or during which the burning material continues to drip from the test specimen (after-drip-time). Sandwich panels with the coating structure to be tested were employed as test specimens for this test.

Specific Smoke Gas Density

The specific optical smoke gas density of the smoke gases evolved during combustion of the coatings was determined in accordance with Point 25, Appendix F, Part V. Sandwich panels with the coating structure to be tested were employed as test specimens for this test.

Smoke Gas Composition

The composition of the smoke gases evolved during the combustion of the coatings was analyzed with respect to toxic components. Within the scope of the test, the specific optical smoke gas density of the smoke evolved was investigated and the concentration of hydrogen cyanide (HCN), carbon monoxide (CO), nitrous gases ($NO_x$), sulfur dioxide ($SO_2$), and hydrogen fluoride (HF) in the smoke gas was determined. Sandwich panels with the coating structure to be tested were employed as test specimens for this test.

Heat Release

The heat release was determined in accordance with Point 25, Appendix F, Part IV. The total heat release and the maximum heat release during the combustion of the coating were thereby determined. Sandwich panels and aluminum plates with the coating structure to be tested were employed as test specimens for this test.

Results

Scratch Resistance

| | Example 1 | | Example 2 | |
|---|---|---|---|---|
| Substrate type | A | B | A | B |
| Weight without scoring [g] | n.m.* | 5000 | n.m. | 5000 |

*n.m.: no measurement performed

Resistance to Chemicals

| | Example 1 | | Example 2 | |
|---|---|---|---|---|
| Substrate type | A | B | A | B |
| Stressing medium | n.m.* | Turco ® 5948-DPM solution | n.m.* | Turco ® 5948-DPM solution |
| Weight without scoring [g] | n.m.* | 3250 | n.m.* | 3000 |

*n.m.: no measurement performed

Cleanability

| | Example 1 | | Example 2 | |
|---|---|---|---|---|
| Substrate type | A | B | A | B |
| Pen ink | ++ | n.m.* | O | n.m.* |
| Felt tip pen ink | ++ | n.m.* | O | n.m.* |
| Inkjet printer ink | ++ | n.m.* | + | n.m.* |
| Lipstick | ++ | n.m.* | ++ | n.m.* |

*n.m.: no measurement performed

Abrasion Resistance

| | Example 1 | | Example 2 | |
|---|---|---|---|---|
| Substrate type | A | B | A | B |
| Abrasion after 500 revolutions [mg] | n.m.* | 18 | n.m.* | 19 |

*n.m.: no measurement performed

Fire Behavior Testing

Flammability

| | Example 1 | | Example 2 | |
|---|---|---|---|---|
| Substrate type | A | B | A | B |
| Fire length [mm] | 94 | n.m.* | 95 | n.m.* |
| After-flame time [s] | 5 | n.m.* | 7 | n.m.* |
| Drip flame time [s] | 0 | n.m.* | 0 | n.m.* |

*n.m.: no measurement performed

Specific Smoke Gas Density

| | Example 1 | | Example 2 | |
|---|---|---|---|---|
| Substrate type | A | B | A | B |
| Specific smoke gas density | 21 | n.m.* | 26 | n.m.* |

*n.m.: no measurement performed

Heat Release

| | Example 1 | | Example 2 | |
|---|---|---|---|---|
| Substrate type | A | B | A | B |
| Total heat release [$kW/m^2$] | 41.17 | 19.82 | 55.38 | 21.03 |
| Maximum heat release [$kW*min/m^2$] | 37.05 | 14.05 | 44.94 | 14.50 |

Smoke Gas Composition

| | Example 1 | | Example 2 | |
|---|---|---|---|---|
| Substrate type | A | B | A | B |
| c(HCN) [ppm] | 2 | n.m.* | 0.19 | n.m.* |
| c(CO) [ppm] | 91 | n.m.* | 1509.4 | n.m.* |
| c($NO_x$) [ppm] | 6 | n.m.* | 2.26 | n.m.* |
| c($SO_2$) [ppm] | 4 | n.m.* | 0 | n.m.* |
| c(HF) [ppm] | 0 | n.m.* | 0 | n.m.* |

*n.m.: no measurement performed

The present invention is not limited to embodiments described herein; reference should be had to the appended claims.

What is claimed is:

1. A coating material comprising:
   10 to 30 wt.-% of a polyol;
   3 to 10 wt.-% of an etherified melamine-formaldehyde resin;

0.1 to 10 wt.-% of an acid catalyst; and
60 to 80 wt.-% of at least one of a flame retardant, a filler, and a pigment based on an overall mass of the coating material,
wherein,
the flame retardant is selected from the group consisting of an inorganic flame retardant, a halogenated flame retardant, a nitrified flame retardant, a boracic flame retardant, an intumescent flame retardant, and mixtures thereof,
the coating material contains a pigment volume fraction of 35 to 60%, the pigment volume fraction being a quotient of a volume of the pigment to a volume of the cured coating material, and
the 60 to 80 wt.-% of the at least one of the flame retardant, the filler, and the pigment based on the overall mass of the coating material is the wt.-% of the at least one of the flame retardant, the filler, and the pigment when combined.

2. The coating material as recited in claim 1, wherein the coating material comprises 65 to 75 wt.-% of at least one of the flame retardant, the filler, and the pigment based on the overall mass of the coating material.

3. The coating material as recited in claim 1, wherein the polyol is selected from the group consisting of a polyacrylate-polyol, a polyester-polyol, a polyether-polyol, a polycarbonate-polyol, a polycaprolactone, and a polyurethane-polyol.

4. The coating material as recited in claim 1, wherein the etherified melamine-formaldehyde resin is selected from the group consisting of a methanol-etherified melamine-formaldehyde resin, an ethanol-etherified melamine-formaldehyde resin, a propanol-etherified melamine-formaldehyde resin, an isobutanol-etherified melamine-formaldehyde resin, and an n-butanol-etherified melamine-formaldehyde resin.

5. The coating material as recited in claim 1, wherein the acid catalyst is selected from the group consisting of a strong Brønsted acid.

6. The coating material as recited in claim 5, wherein the strong Brønsted acid is an organic sulphonic acid.

7. The coating material as recited in claim 1, wherein the filler is selected from the group consisting of a carbonate, a sulfate, a silicate, a silicic acid, and an oxide.

8. The coating material as recited in claim 1, wherein the pigment is an inorganic pigment.

9. The coating material as recited in claim 1, further comprising a non-ionic silver particle.

10. The coating material as recited in claim 1, wherein the coating material, when cured, comprises a total dry layer thickness of 80 to 110 µm.

11. An interior component for a passenger transport vehicle, the interior component comprising at least one surface coating produced from the coating material as recited in claim 1.

12. A method of using the coating material as recited in claim 1 on a surface of an interior component, the method comprising:
providing the coating material as recited in claim 1;
providing the interior component; and
coating the interior component with the coating material.

13. The method of using as recited in claim 12, wherein,
the interior component is made from a thermoplastic, a glass fiber-reinforced fiber composite material in a monolithic construction or a sandwich construction, a carbon fiber-reinforced fiber composite material in a monolithic construction or a sandwich construction, and a metal, and
the coating material is used as a finish.

14. The method of using as recited in claim 12, wherein,
the interior component is made from a glass fiber-reinforced fiber composite material in a monolithic construction or a sandwich construction, a carbon fiber-reinforced fiber composite material in a monolithic construction or a sandwich construction, and
the coating material is used as an in-mold coating.

15. A method of manufacturing a coated component, the method comprising:
providing the coating material as recited in claim 1;
applying the coating material to a surface of a component to form a first layer; and
curing the first layer via an IR drying or via a convection drying.

16. The method as recited in claim 15, further comprising:
applying a further layer of the coating material over the first layer to form a second layer; and
curing the second layer via the IR drying or via the convection drying.

17. The method as recited in claim 16, wherein the coating material is cured for 5 to 90 min. at a temperature of from 80 to 110° C.

18. The method as recited in claim 16, further comprising:
printing the first layer or the second layer as a top layer via an inkjet method so as to obtain an imprinted surface.

19. The method as recited in claim 18, further comprising:
applying an FST-conformal clear coat to the imprinted surface; and
curing the FST-conformal clear coat.

* * * * *